United States Patent [19]

Schulte

[11] Patent Number: 5,036,202

[45] Date of Patent: Jul. 30, 1991

[54] BI-DIRECTIONAL NEUTRON DETECTOR

[75] Inventor: Robert L. Schulte, Port Washington, N.Y.

[73] Assignee: Grumman Aerospace Corporation, Bethpage, N.Y.

[21] Appl. No.: 513,978

[22] Filed: Apr. 24, 1990

[51] Int. Cl.⁵ .................................................. G01T 3/08
[52] U.S. Cl. .......................... 250/370.05; 250/370.06; 250/370.1; 250/390.01; 250/390.12
[58] Field of Search ...................... 250/390.12, 390.07, 250/390.01, 370.10, 370.05, 370.09, 370.06; 376/153

[56] References Cited

U.S. PATENT DOCUMENTS 4,516,028  5/1985  Riggan ........................ 250/370.05

Primary Examiner—Edward P. Westin
Assistant Examiner—James E. Beyer
Attorney, Agent, or Firm—Pollock, VandeSande & Priddy

[57] ABSTRACT

A bi-directional neutron detector comprises spaced hydrogenous layers interspersed with stacks of silicon detector layers. The energy loss from each of these layers is read out and a pattern of energy loss corresponds to the direction of travel of the recoil proton.

9 Claims, 2 Drawing Sheets

BI-DIRECTIONAL NEUTRON DETECTOR

FIELD OF THE INVENTION

The present invention relates to neutron detectors, and more particularly to such a detector employing a multi-layer silicon structure for operating bi-directionally.

CO-PENDING APPLICATION

This application relates to the subject matter set forth in my co-pending application Ser. No. 07/559,071, filed Jul. 30, 1990, and assigned to the present assignee.

BACKGROUND OF THE INVENTION

In many scientific applications, it is necessary to detect the direction of passing neutrons. Traditionally, this has been a difficult thing to do inasmuch as neutrons are neutrally charged and therefore do not, by themselves, develop electrical potential.

The prior art includes a number of detectors utilizing a convertor layer of hydrogenous material, such as polyethylene adjacent to a silicon detector. When a neutron of sufficient energy passes through the hydrogenous layer, one or more protons will be liberated and the passage of these protons through the silicon layer results in the generation of a measurable electrical potential. However, these basic structures are only capable of detecting the presence of neutron flux, but are incapable of establishing the direction of this flux.

A recent concept proposed by Los Alamos National Laboratory incorporates a stacked structure of single alternating hydrogenous and silicon layers. The direction of incidence for a neutron can be deduced by measuring the track and total energy of a recoil proton as it passes through the detector. However, the concept requires a very highly segmented detector (e.g. microstrips) and copious signal processing as well as data analysis.

BRIEF DESCRIPTION OF THE INVENTION

The advantage of the present technique for achieving directionality is centered upon the fact that the detector of the present invention can unambiguously determine whether each neutron event is incident from the front or rear of the detector with minimum signal processing and data analysis.

In the present invention the hydrogenous layers are separated by multiple silicon particle detectors. An incident neutron passing through a first layer of hydrogenous material liberates a proton which then passes through the stacked particle silicon detector layers and deposits energy in each layer, the amount of which depends upon the thickness of a silicon layer and the proton-stopping power thereof. The signals produced by the silicon detectors are proportional to the energy loss in the detector layers and these will vary as the proton loses more and more energy during its travel through the silicon detector layers. Thus, a pattern of energy loss is established through the stack of silicon layers which, in turn, is indicative as to whether the neutron producing the recoil proton has entered the detector from a front direction or a rear direction. This determination may be made relatively simply and without the necessity of measuring the track and total energy of a recoil proton as it passes through the detector, as is the case with the most relevant prior art.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Prior to discussing the invention in detail, a short review of the most relevant prior art will be discussed in connection with FIG. 1. Typically, an incident neutron passes through a converter member which, as previously explained, may be a hydrogenous material such as polyethylene which freely liberates a proton in response to an incident neutron collision. After collision, the scattered neutron will most often deflect from its original path. Likewise, a liberated or recoil proton will be propelled at an angle theta relative to the original path of the incident neutron. The recoil proton can be optionally subjected to a filter or absorber layer, such as aluminum or carbon, for absorbing low energy recoil protons so as to increase the signal-to-noise ratio of the detector. The actual detector layer indicated is preferably a silicon layer which will develop an ionization region when subjected to energy loss by the recoil proton traversing the detector layer. The presence of the ionization region produces an electrical signal which is indicative of neutron detection. However, this basic prior art structure is incapable of determining direction of the neutron.

Figure 1:
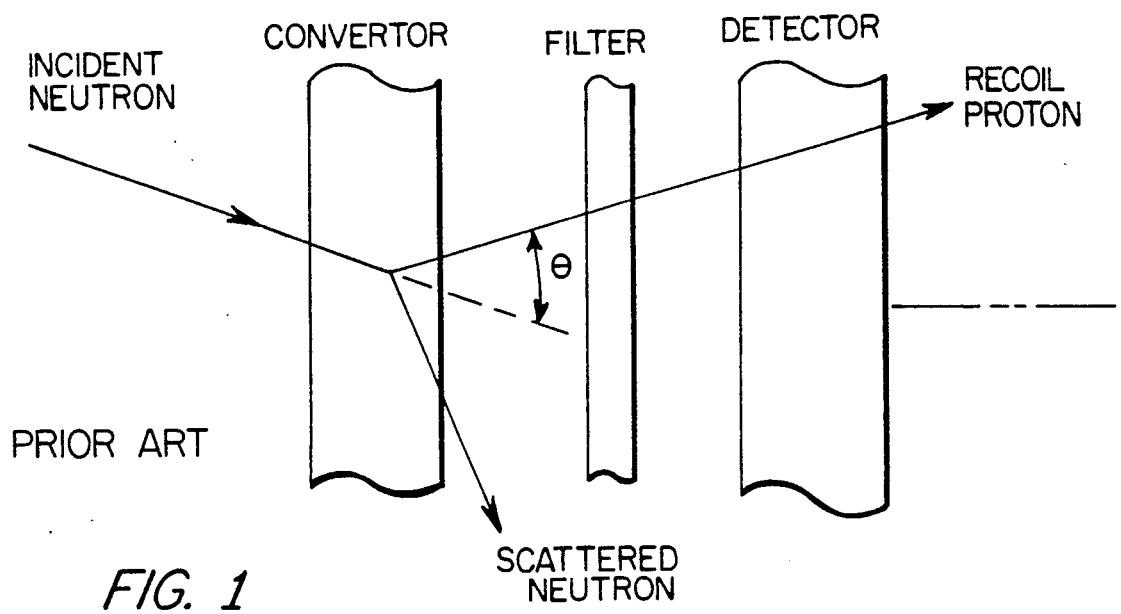
FIG. 1 is a basic diagrammatic view of the prior art.

More relevant prior art is that previously referenced in connection with the concept of the Los Alamos National Laboratory wherein the structure shown in FIG. 1 is repeated so that there are adjacent repeating units each consisting of converter and detector layers. However, as previously explained the concept requires the tracking of the recoil protons between succeeding detector layers and this results in a highly segmented detector requiring copious signal processing and data analysis.

Figure 2:
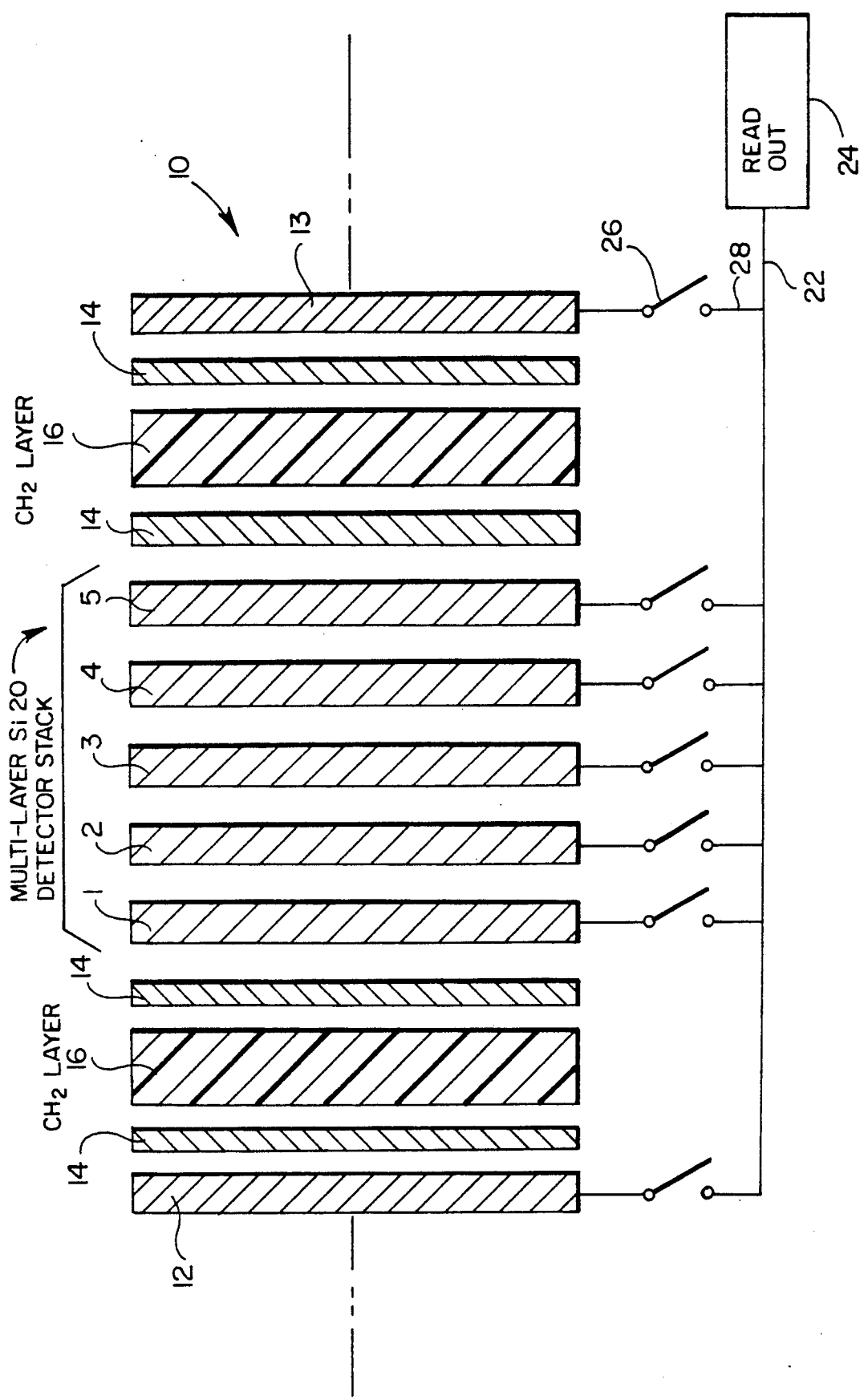
FIG. 2 is a diagrammatic sectional view of the present invention.

FIG. 2 shows the improvement of the present invention. A single segment 10 is shown in the figure but it is to be understood that the layers shown therein may be repeated several times to form a more efficient detector. Thus, a silicon stack 12 is shown from an immediately preceding segment while the last layer 13 indicates the beginning of an immediately succeeding segment.

Figure 3A:
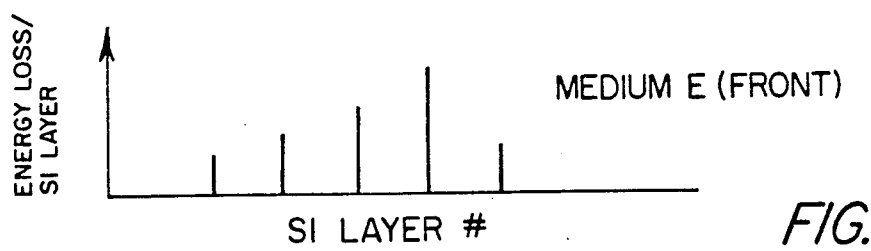
FIG. 3A is a simplified plot of energy loss in the various silicon stacks of the present invention where a liberated proton has medium energy and approaches from the front.
Figure 3B:
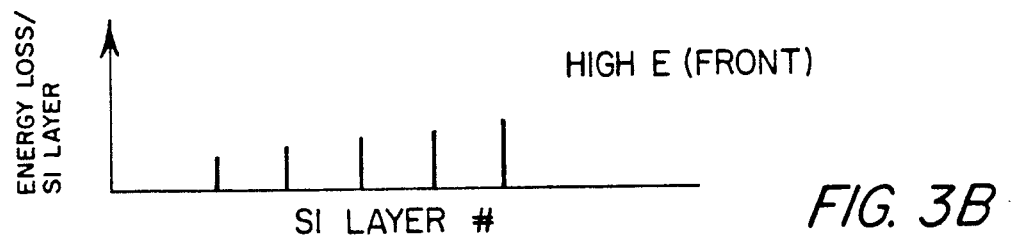
FIG. 3B is a simplified plot of energy loss in the various silicon stacks of the present invention where a liberated proton has high energy and approaches from the front.

Any neutron entering the indicated layers from left to right may free a proton in the polyethylene (CH$_2$) layer 16. The proton absorption or filter layer 14 will help absorb low energy protons over a short distance of the detector so that a high signal-to-noise ratio may be obtained. Any recoil proton penetrating layer 14 will encounter the adjacently positioned silicon layers 1-5 of the multi-layer detector stack 20. Since a recoil proton will lose some of its energy to each layer 1-5, electrical signals may be read at each encountered layer. However, since the recoil proton will lose more of its energy as it slows down, a pattern will be established with increasing signal levels, as indicated in FIG. 3B. In that figure, a high energy proton is detected as it passes through all of the layers 1-5 with correspondingly increasing energy losses. Thus, by using electronic comparator circuitry or viewing the results of FIG. 3B, one can easily determine that a high energy proton has, in fact, passed from left to right. However, in the event that a medium energy proton passes through the layers 1-5, it may be seen in FIG. 3A how there are increasing energy losses for the first four layers followed by a decrease of energy loss in the fifth layer, thereby indicating that the forward speed of the recoil proton is nearing zero. Nevertheless, the pattern in FIG. 3A over the first four layers clearly indicates that the proton was traveling from left to right since the energy losses of the proton increased as it traveled between detector layers 1-4.

Figure 3C:
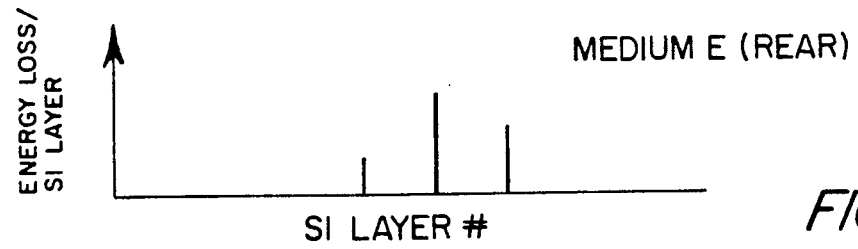
FIG. 3C is a simplified plot of energy loss in the various silicon stacks of the present invention where a liberated proton has medium energy and approaches from the rear.
Figure 3D:
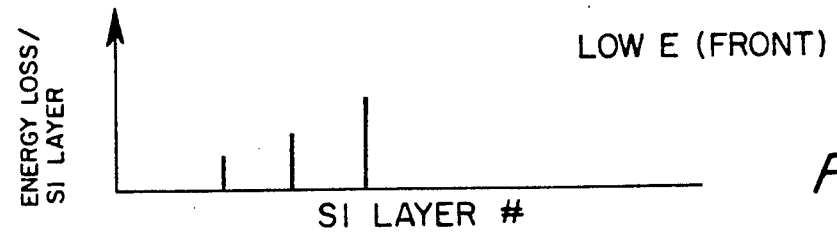
FIG. 3D is a simplified plot of energy loss in the various silicon stacks of the present invention where a liberated proton has low energy and approaches from the front.

FIG. 3D indicates a proton of relatively low energy passing through the detector layers 1-5. Although the proton velocity was non-existent after encountering the third layer, the increasing energy losses for the first three layers determines the fact that the proton traveled from left to right.

FIG. 3C illustrates the energy loss for a proton traveling in a reverse direction, namely from right to left. As will be seen, there is an increase of energy loss between the fifth and fourth layers, after which the energy loss diminishes greatly in the third layer indicating the proton speed approaching zero. The pattern of energy loss increase from right to left in FIG. 3C indicates a rearwardly entering neutron.

The presence of the rightmost illustrated polyethylene layer 16 increases the probability that incident neutrons passing therethrough may again create recoil protons. Thus, the hydrogenous layers are repeated so as to generate as many recoil protons as possible from the incident neutrons and thereby increase the detection efficiency of the system. The repetition of detector layers 1-5 in succeeding segments of the detector will again establish energy loss patterns indicative of whether a neutron is passing from left to right or the reverse. The silicon detector layers 1-5 may be silicon surface barrier layers of the type sold by Ortec Division of the EGG Corporation of Massachusetts.

FIG. 2 also illustrates the diagrammatic connection of a readout device 24 to the individual detector layers 1-5 of stack 20 by means of a cable 22. The type of readout device does not, per se, form part of the present invention but is merely intended to show any type of appropriate device which determines the electrical signal output from each layer 1-5.

In an intense high-energy neutron environment, it is possible that a number of detector layers will experience a very high event or count rate so as to result in an excessive output signal rate on the extreme or outermost detector layers thereby leaving an absence of an energy loss pattern between them. In such a case it would simplify matters to switch out these layers from detection measurement. To that end, individual switches 26 are connected in each branch 28 of the readout cable 22. Thus, in an intense high energy neutron environment, the "swamped" layers in stack 20 may be switched out to such an extent as is necessary to achieve a meaningful energy loss pattern.

The technique of switching out the outermost detectors serves to increase the energy threshold of neutrons detected by this device. This is accomplished because only higher energy recoil protons are able to penetrate the filter and the "switched out" silicon layer. By switching out the outermost silicon layers, these layers are in effect increasing the filter thickness and the direction of the recoil proton is determined by the innermost silicon layers. So a variable energy threshold for neutrons is effected by this technique without any loss of efficiency for high energy neutrons which produce recoil protons capable of penetrating the filter plus the "switched out" layers. The change in the energy threshold is determined by the thickness of the outermost silicon layers.

It should be understood that the invention is not limited to the exact details of construction shown and described herein for obvious modifications will occur to persons skilled in the art.

I claim:

1. A bi-directional neutron detector comprising:
   means for freeing recoiling protons upon incidence of neutrons, having two separated layers of hydrogenous material;
   a plurality of electrically uniform silicon layers interposed between the hydrogenous layers, through which the recoil protons pass with increasing loss of energy; and
   means for individually measuring the energy loss of recoil protons in each silicon layer for establishing energy loss patterns indicative of proton path direction.

2. The structure set forth in claim 1 together with means located between at least one of the hydrogenous layers and the silicon layers for absorbing low energy recoil protons passing through the detector thereby improving signal-to-noise ratio of measurement.

3. The structure set forth in claim 1 together with switch means for disconnecting preselected detector layers from the measuring means thereby producing a variable energy threshold for neutrons and whereby energy loss continue through the disconnected layers while maintaining the layers inactive for measurement.

4. The structure set forth in claim 1 wherein the hydrogenous material is polyethylene.

5. A bi-directional neutron detector having a plurality of repetitive segments, each segment comprising:
   means for freeing recoiling protons upon incidence of neutrons, having two separated layers of hydrogenous material;
   a plurality of silicon layers interposed between the hydrogenous layers, through which the recoil protons pass with increasing loss of energy;
   means for individually measuring the energy loss of recoil protons in each silicon layer for establishing energy loss patterns indicative of proton path direction;
   means located between at least one of the hydrogenous layers and the silicon layers for absorbing low energy recoil protons passing through the detector thereby improving signal-to-noise ratio for measurement; and switch means for disconnecting preselected detector layers from the measuring means producing a variable neutron energy threshold whereby energy loss continues through the disconnected layers while maintaining the layers inactive for measurement.

6. A method for bi-directionally detecting neutrons comprising the steps:
subjecting a hydrogenous layer to incident neutrons thereby freeing recoil protons;
passing the protrons through a series of tandem positioned electrically uniform silicon layers, wherein a passing proton loses energy in increasing amounts as it passes through the silicon layers;
measuring the energy lost by the protons in each silicon layer;
whereby a pattern of increasing losses between layers determines the direction of proton recoil.

7. The method set forth in claim 6 together with the step of absorbing low energy recoil protons passing through the silicon layers thereby improving measurement signal-to-noise ratio.

8. The method set forth in claim 6 together with the step of disconnecting preselected silicon layers for measurement whereby energy loss continues through the disconnected layers while maintaining the layers inactive for measurement.

9. The method set forth in claim 7 together with the step of disconnecting preselected silicon layers for measurement producing a variable neutron energy threshold whereby energy loss continues through the disconnected layers while maintaining the layers inactive for measurement.

* * * * *